UNITED STATES PATENT OFFICE.

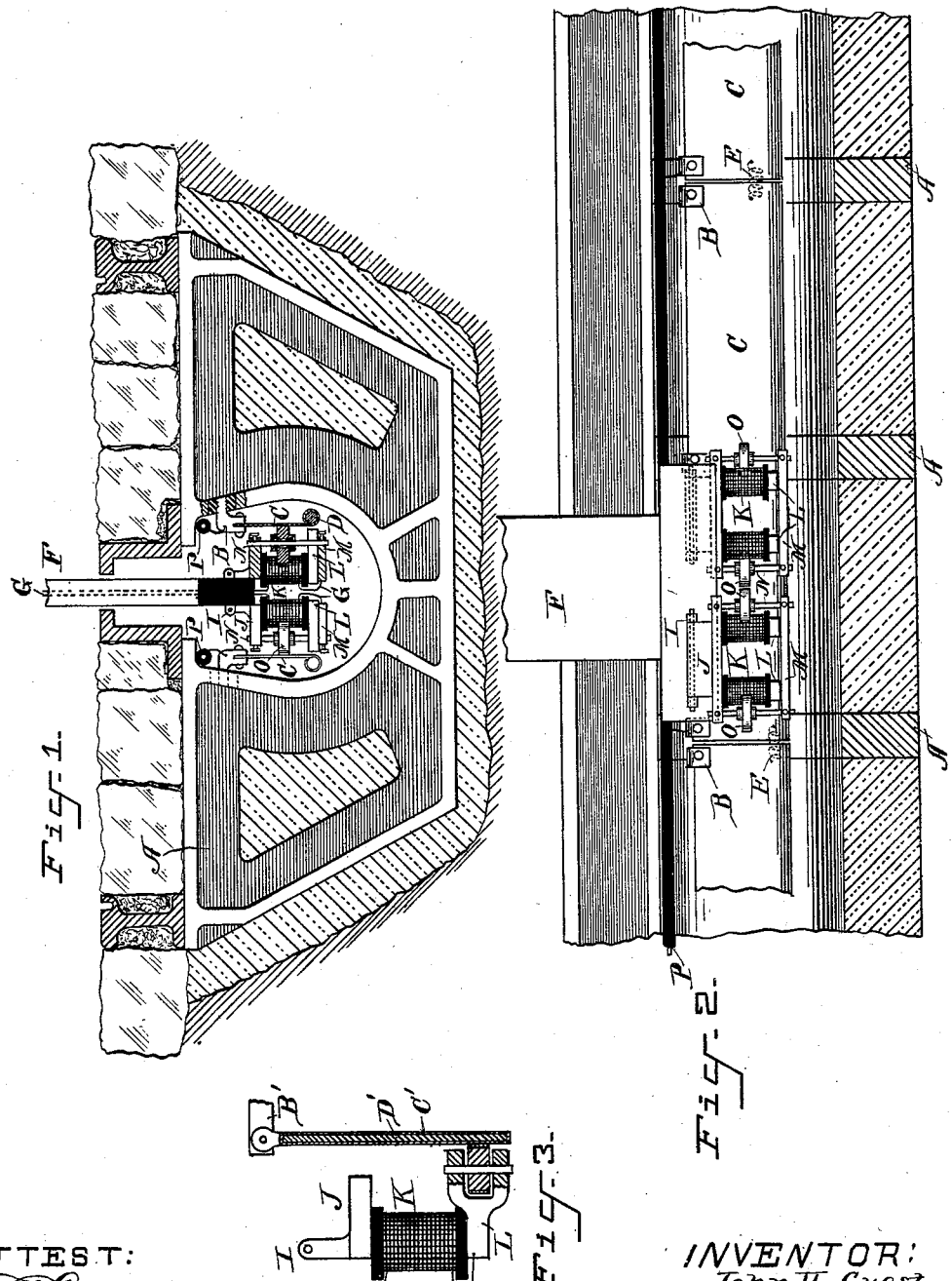

JOHN H. GUEST, OF BOSTON, MASSACHUSETTS.

CONDUIT ELECTRIC RAILWAY.

SPECIFICATION forming part of Letters Patent No. 537,194, dated April 9, 1895.

Application filed June 18, 1894. Serial No. 514,873. (No model.)

*To all whom it may concern:*

Be it known that I, JOHN H. GUEST, a citizen of the United States, and a resident of Boston, in the county of Suffolk and State of Massachusetts, have invented a certain new and useful Improvement in Conduit Electric Railways, of which the following is a specification.

My invention relates to conduit electric railways and has for its object an improved construction and arrangement of the parts employed in the transmission of the current to the car motors.

One perplexity met with in this class of railways arises from the difficulty experienced in keeping the current collector or brush in constant and perfect electrical contact with the conductor. Where the conductor is simply a wire stretched from one support to another and a trolley is intended to run thereon, it is almost impossible to so mount the trolley that the variations in the movement of its support shall be compensated for and yet allow it to be always in perfect engagement with the conductor. This same difficulty also exists where the conductor is a rigid bar or rod. I propose to overcome these objections by so constructing and arranging my current collector and the conductor that it will not be necessary to compensate in any way for the vertical fluctuations of the current collector, be it brush or trolley, and yet secure constant and perfect contact between it and the conductor.

With these ends in view my invention consists in suspending the conductor or the collector, or both, in a manner such as to provide for lateral movement thereof, and in combining therewith magnetic means for keeping them in constant electrical contact.

It further consists in suspending the conductor in a manner to provide lateral movement therefor and in providing the collector with a magnet for attracting the conductor thereto and thereby insuring constant electrical contact.

The invention further consists in hinging the collector brush or trolley to the suspending arm thereof and in combining therewith a magnet which shall insure perfect engagement with the movable conductor.

My invention further consists in the construction, arrangement and combination of parts as hereinafter described and pointed out in the claims.

In the accompanying drawings which form a part of this specification: Figure 1, represents a vertical transverse section, through a conduit showing the conductors and collector constructed and arranged in accordance with my invention. Fig. 2, represents a longitudinal vertical section of said conduit, showing the collector and conductor in side elevation; and Fig. 3, is a detail of a modification both of the collector and the conductor.

My invention may be adapted to any form of conduit which will admit my collector, but I have chosen to show it in connection with a conduit formed of yokes A, which are embedded in concrete in the usual way and support the rails of the track, as well as the slot rails and other parts of the conduit.

To the walls of the conduit, I secure brackets as B, which must be suitably insulated from the conduit and the ground. I have shown these brackets secured in the side walls of the conduit but they may obviously be located at any other point and be of any other form so long as they act to suspend the conductor in a position substantially as shown. From these brackets I suspend the working conductors, which may be formed in various ways. In Figs. 1 and 2, I have shown one form, which consists of plates C, of copper or other good conducting material suspended by one edge from the brackets B, and having a rod or wire D, of iron or steel secured thereto preferably at or near the lower edge thereof. One convenient way, and the one I deem preferable for attaching this rod to the plate is by rolling it into the lower edge of the plate as shown. This roll should be so made that moisture cannot reach the rod and at the same time it must not so bind the rod as to prevent the two different metals from freely expanding and contracting under changes in temperature. This latter precaution is necessary to prevent buckling.

Another mode of formation and suspension of the conductor is shown in Fig. 3, wherein the iron or steel portion D', is in the form of a plate or sheet and is incased completely with copper C'. The conductor thus formed is suitably hinged to the wall of the conduit as by studs or brackets B'.

The conductor obviously can be formed and suspended in many other ways, the object being to produce a conductor which shall consist of or contain good conducting material and which shall also be adapted to respond to magnetic attraction, which shall be capable of lateral movement and which when formed of or containing corrosive metal, such as iron or steel, shall be preferably so constructed that said metal shall be protected from corrosion.

Conductors thus formed and suspended will extend throughout the conduit, and to provide against buckling due to expansion and contraction they will be divided into suitable sections as shown in Fig. 2, each section being electrically connected to the other in any convenient manner as by means of wires shown at E. This division into sections is also beneficial in another direction. It enables the conductor to respond more readily to the attraction of the magnets carried by the collector; also should my invention be applied to a system using sectional conductors, the conductor divided as above may be readily utilized, one section of the conductor making a section in said system, or each section in the system being made up of several of the sections connected as shown.

The collector consists of the usual suspension arm F, through or along which the conductors G, are led to the motor. This arm extends into the conduit and has secured thereto magnetic devices for attracting the conductor or conductors as the case may be and also current collecting devices. These magnetic devices may be of any desired form such as will serve to attract the conductors and the collectors may be also of any suitable construction. The magnetic device may even terminate in a collector or the collector terminate in a magnetic device. I have, however, for the sake of illustration, chosen to represent both of these features as follows: To the lower end of the arm F, is connected a plate or bar H, of suitable insulating material. On each side of this bar is hinged, as at I, a combined attracting and collecting device. This device consists of a plate J, through which said hinging is effected. This plate also forms the strap of a horseshoe magnet bearing coils K, formed in the conductor G, which conveys current to the motor and having pole pieces L, extending therefrom toward their respective conductors. Across the pole pieces is connected a plate or bar M, in which and the plate J, are secured shafts N, upon which are mounted by ball bearings, in any approved manner, the collector wheels O, which are adapted in their normal position to roll along against the plates of the conductors making side contact therewith.

It will be noticed that the collector wheels are so located that they will span the breaks in the conductor plates and that the advance wheel will on passing a break be in position to engage the next section of the conductor when the magnet attracts it and before the rear wheel has passed off the other section; also that said wheels project sufficiently beyond the pole pieces to prevent the latter from striking the ends of the sections, should said sections not be exactly in line when the collector reaches a break, and also to prevent friction between the poles and the conductors.

It will also be noted that I have shown the collectors and their magnets adapted to move toward the conductors as well as the conductors being adapted to move toward the collectors but obviously one may be mounted rigidly while the other alone is allowed to swing. It is also apparent that a collector brush or brushes may be used in the place of the wheels without departing from my invention, each broadly speaking being the equivalent of the other.

Vertical movement of the collectors in no wise affects or impairs their contact with the conductors as they have the full surface of the conductors to engage with and the magnets will at all times be in attracting proximity to the iron or steel portions of the conductors which portions act as armatures across the poles of the magnets.

Another one of the many ways which may be devised for attracting the conductor and taking current therefrom is shown in Fig. 3, wherein a collector wheel is mounted in each polar extension, only one such extension being shown therein. For this purpose said wheel may be of iron or steel and provided with a tire of brass or copper to afford a better contact surface, and in the case of the conductor being bare iron or steel, to prevent sticking. In this construction the wheels might also be wholly of brass or copper, the forks of the pole pieces projecting sufficiently near to the conductor to attract it without the necessity of depending upon the aid of magnetism in the wheels.

The horseshoe magnets may be permanent magnets and may or may not be assisted by the coils in the circuit G.

I have shown my invention as adapted to a system in which the working conductors in both the direct and return circuit are located in the conduit and both operated upon in the same way, the supply circuit conductors being shown at P, from which taps lead, in the usual way, to the sections of the working conductors; but where the return is made through one of the track rails, one of the combined attracting and collecting devices may be omitted and the return from the motor be led to the rail as usual in such systems.

A conduit system equipped in the manner substantially as above specified cannot fail in the matter of a perfect contact between the conductor and the collectors, though many changes in the details of construction and arrangement may be made.

I claim as my invention—

1. In an electric railway, the combination of a working conductor divided into sections each of which is in direct connection with the supply wire, a traveling current collector making side contact with said conductor sections and magnetic means for keeping the two in constant electrical contact irrespective of any variation vertically in the position of either, said conductor and collector while in contact being adapted to move laterally with relation to one another without disturbing the connection between the conductor and the supply wire, as and for the purpose set forth.

2. In an electric railway, the combination with a suspended conductor movable laterally throughout its length, of a current collector for engagement therewith, and a magnet associated with said collector for attracting the conductor and insuring perfect electrical contact between collector and conductor.

3. In an electric railway, the combination with a suspended conductor consisting of a sheet of metal connected at one edge and free to move laterally at the other, of a current collector or contact for engagement therewith, and a magnetic device associated with the collector for insuring perfect contact between it and the conductor.

4. In an electric railway, the combination of a conductor consisting of a sheet of non-corrosive conducting material incasing a strip or bar of iron or steel and suspended by one edge in a manner to allow lateral movement to the other edge, and a collector engaging therewith and provided with a magnetic device for drawing the collector and conductor into perfect electrical engagement.

5. An electrical conductor consisting of a sheet of conducting material suspended by one edge and having combined therewith a strip or bar of iron or steel.

6. In an electric railway, a sectional plate conductor containing magnetic material and suspended in a vertical plane each section of which is capable of independent lateral movement.

7. In an electric railway, the combination with a conductor suspended to move laterally and responsive to magnetic attraction, of a traveling current collector for making side contact therewith hinged to its supporting arm, and a magnet connected to said collector and provided with pole pieces approaching the conductor for holding the collector and conductor in electrical contact.

8. In an electric railway, the combination with a conductor suspended to move laterally and responsive to magnetic attraction, of a current collector for making side contact therewith consisting of a magnet hinged to the collector arm and provided with pole pieces extended toward the conductor, and one or more contact wheels mounted to swing with said magnet and to engage said conductor.

9. In an electric railway, the combination with a plate conductor suspended to swing laterally and responsive to magnetic attraction, of a current collector consisting of a magnet hinged to the supporting arm of the collector and provided with a pole piece extending toward the conductor, and a contact wheel journaled in said pole piece and bearing upon the side of said conductor.

10. A conductor for electric railways consisting of a sheet of iron coated with copper and freely suspended by one edge thereof.

Signed at New York, in the county of New York and State of New York, this 15th day of June, A. D. 1894.

JOHN H. GUEST.

Witnesses:
WM. H. CAPEL,
T. F. CONREY.